(12) United States Patent
Ralph et al.

(10) Patent No.: US 7,771,594 B2
(45) Date of Patent: Aug. 10, 2010

(54) APPARATUS FOR REMOVING SUSPENDED SOLIDS FROM AQUEOUS FLUIDS

(76) Inventors: Ambrose Ralph, 10710-72 Avenue, Grande Prairie, AB (CA) T8W 2T6; Randy Wold, RR 2, Site 2, Box 21, Grande Prairie, AB (CA) T8V 2Z9; Roger Allard, 554 Chestermere Drive, Chestermere, AB (CA) T1X 1B4

( * ) Notice: Subject to any disclaimer, the term of this patent is extended or adjusted under 35 U.S.C. 154(b) by 336 days.

(21) Appl. No.: 11/928,107

(22) Filed: Oct. 30, 2007

(65) Prior Publication Data

US 2008/0251465 A1  Oct. 16, 2008

Related U.S. Application Data

(60) Provisional application No. 60/911,984, filed on Apr. 16, 2007.

(51) Int. Cl.
*C02F 1/52* (2006.01)
*B01D 21/01* (2006.01)

(52) U.S. Cl. .............. 210/195.1; 175/206; 210/199; 210/205; 210/208; 210/522

(58) Field of Classification Search .............. 210/199
See application file for complete search history.

(56) References Cited

U.S. PATENT DOCUMENTS

| | | | | |
|---|---|---|---|---|
| 2,186,371 | A | * | 1/1940 | Durdin, Jr. .............. 210/703 |
| 2,817,440 | A | * | 12/1957 | Casner et al. .............. 209/208 |
| 4,142,970 | A | * | 3/1979 | von Hagel et al. .......... 210/738 |
| 4,417,988 | A | | 11/1983 | Cordoba-Molina et al. |
| 4,536,286 | A | * | 8/1985 | Nugent .............. 210/202 |
| 4,636,308 | A | | 1/1987 | Summers |
| 4,710,290 | A | | 12/1987 | Briltz |
| 5,422,012 | A | | 6/1995 | Adams |
| 5,529,695 | A | | 6/1996 | Gwozdz |
| 5,620,600 | A | * | 4/1997 | Smati .............. 210/519 |
| 5,643,443 | A | * | 7/1997 | Ishikura .............. 210/113 |
| 5,770,091 | A | * | 6/1998 | Binot et al. .............. 210/711 |

(Continued)

FOREIGN PATENT DOCUMENTS

CA        2200524        9/1998

(Continued)

*Primary Examiner*—Peter A Hruskoci
(74) *Attorney, Agent, or Firm*—Donald V. Tomkins

(57) ABSTRACT

An apparatus for cleaning solids-laden aqueous fluids includes a settling tank having a sloping floor, which drops off into a collection area; primary and secondary mixing tanks, the lower regions of which are in fluid communication via fluid transfer means; and agitators in each of the mixing tanks. Solids-laden fluid is introduced into the primary mixing tank along with selected coagulant and/or flocculent chemicals, whereupon the agitator in the primary mixing tank is actuated to induce downward fluid flow toward the fluid transfer means and into the secondary mixing tank. The agitator in the secondary mixing tank is actuated to induce upward fluid flow in the secondary mixing tank, from which the fluid mixture overflows into the setting tank. Solids settle or precipitate into the settling tank, and move downward along the settling tank's sloped floor and into the collection area, from which the solids can be removed for further treatment or disposal. Clean water is collected from the upper region of the settling tank, preferably via a spillway along the perimeter of the settling tank.

28 Claims, 6 Drawing Sheets

U.S. PATENT DOCUMENTS

| | | |
|---|---|---|
| 6,059,977 A | 5/2000 | Rowney et al. |
| 6,193,070 B1 | 2/2001 | Rowney et al. |
| 6,391,195 B1 | 5/2002 | Layton |
| 6,863,809 B2 | 3/2005 | Smith et al. |
| 7,001,527 B2 * | 2/2006 | Stever et al. ............ 210/747 |
| 7,147,111 B2 * | 12/2006 | Fendley ............ 210/522 |
| 7,160,474 B2 * | 1/2007 | Harding ............ 210/801 |
| 7,431,846 B2 * | 10/2008 | Palmer ............ 210/710 |

FOREIGN PATENT DOCUMENTS

CA      2385739      11/2003

* cited by examiner

APPARATUS FOR REMOVING SUSPENDED SOLIDS FROM AQUEOUS FLUIDS

CROSS-REFERENCE TO RELATED APPLICATIONS

This application claims the benefit, pursuant to 35 U.S.C. 119(e), of U.S. Provisional Application No. 60/911,984, filed on Apr. 16, 2007, and said provisional application is incorporated herein by reference in its entirety.

FIELD OF THE INVENTION

The present invention relates to methods and apparatus for removing suspended solids from aqueous fluids, and from water-based drilling fluids in particular.

BACKGROUND OF THE INVENTION

It is often necessary or desirable, in various industrial applications, to treat solids-laden aqueous fluids to remove the solids and recover substantially clean water for re-use. A particular example is found in drilling operations in the petroleum industry, where water and water-based fluids are commonly used as drilling fluids (or drilling "muds"), for purposes including cooling of the drill bit and removing drill cuttings from the well bore. The drilling fluid is injected down the drill stem and exits through the drill bit, and then is forces to the ground surface through the annular space between the drill stem and the well bore, carrying excavated material (i.e., cuttings) to the surface in suspension. The "used" fluid is then processed to remove the suspended solids, which are then disposed of, leaving substantially clean water than can be re-used in the well, or used for other purposes.

There are various known methods and apparatus for removing solids from aqueous fluids, involving the use of some combination of settling tanks, mechanical agitation, chemical treatment (e.g., using precipitation-enhancing agents such as coagulants and flocculants), and/or mechanized transport of settled or precipitated solids. The present invention teaches an improved apparatus and method for removing suspended solids from aqueous fluids, using lower amounts of coagulants and flocculants than known systems, and without requiring conveyors or other mechanized means for transporting settled or precipitated solids from the apparatus.

BRIEF DESCRIPTION OF THE INVENTION

Conventional wisdom in the field of the invention has been that flocculants cannot be effectively used in conjunction with agitation (the thinking being that agitation causes flocculants to lose effectiveness). However, the inventors have discovered that this conventional view is not necessary correct, as the present invention provides a way of using flocculants with agitation in an effective manner, in conjunction with regulation of agitator operation to suit various operational factors.

In accordance with the invention, a flow of solids-laden aqueous fluid is introduced into a primary mixing tank which is in fluid communication with a secondary mixing tank by means of fluid transfer means (such as a tank opening or conduit) connecting the lower regions of the primary and secondary mixing tanks. Selected coagulant and/or flocculent chemicals are introduced into the primary mixing tank and mixed with the solids-laden aqueous fluid by using agitator means preferably configured to urge or direct the mixture downward within the primary mixing tank, and toward and through the fluid transfer means into the secondary mixing tank. The secondary mixing tank in turn has agitator means preferably configured to urge or direct the mixture upward within the secondary mixing tank. The secondary mixing tank is provided with overflow means (such as a scupper or conduit) whereby the mixture of the solids-laden aqueous fluid and chemical additives flows out of an upper region or zone of the secondary mixing tank into a larger settling tank, which is preferably but not necessarily directly adjacent to the primary and secondary mixing tanks.

The settling tank has a sloping floor which drops off into a collection area at the settling tank's "deep end", such that solids and sludge that settle or precipitate from fluid in the settling tank will tend to move down the sloping floor toward the collection area. One or more sludge outlet ports are provided in association with the collection area, to facilitate removal of accumulated sludge and solids from the collection area (preferably using suitable pumps) to external treatment equipment (such as centrifuges) or to disposal facilities.

The secondary mixing tank is preferably located close to the deep end of the settling tank so that solids settling or precipitating out of the chemically-treated mixture entering the settling tank from the secondary missing tank's overflow means will have a shorter travel distance to the collection area.

As solid materials settle out of the aqueous liquid mixture in the settling tank, a zone of comparatively clean water forms in the upper region of the settling tank. This clean water can be drawn or decanted from the upper region of the setting tank by any suitable means. In preferred embodiments, however, the settling tank is provided with a spillway running along a portion of the upper perimeter of the settling tank, with one or more gates operable to permit flow of clean water from the settling tank into the spillway, from which the clean water can be collected for storage or direct re-use as desired. The spillway and gates can also be used for introducing clean water into the settling tank to regulate the concentration of solids in the liquid mixture in the settling tank.

By providing two interconnected mixing tanks, with agitation means adapted to induce or promote swirling fluid flow downward within the primary mixing tank and upward within the secondary mixing tank, the apparatus helps to keep additive chemicals (e.g., coagulants and/or flocculants) thoroughly mixed with the solids-laden fluid prior to being discharged into the settling tank. This enhances the effectiveness of the chemicals and thus results in lower chemical consumption compared to other methods for removing solids from aqueous fluids.

Accordingly, in a first aspect the present invention is a water recovery apparatus for recovering water from aqueous fluids containing suspended solid matter, comprising:
  (a) a settling tank having a sloping floor extending from an upper end to a lower end;
  (b) a collection chamber adjacent to, and having a floor lower than, said lower end of the settling tank's sloping floor, said collection chamber having an outlet port;
  (c) a primary mixing tank;
  (d) primary agitation means associated with the primary mixing tank;
  (e) a secondary mixing tank;
  (f) secondary agitation means associated with the secondary mixing tank;
  (g) fluid transfer means whereby fluids can flow from a lower region of the primary mixing tank into a lower region of the secondary mixing tank; and (h) overflow means whereby fluids can flow from an upper region of the secondary mixing tank into the settling tank.

In a second aspect, the present invention is a water recovery method for recovering water from aqueous fluids containing suspended solid matter, comprising the steps of:

(a) providing a water recovery apparatus as described above in connection with the first aspect of the invention;

(b) introducing a flow of solids-laden aqueous fluid into the primary mixing tank of the water recovery apparatus;

(c) introducing selected amounts of precipitation enhancement agents into the primary mixing tank, said chemical agents being selected from the group consisting of coagulants; and (d) activating the primary and secondary agitation means of the water recovery apparatus so as to:

d.1 mix the precipitation enhancement agents with the solids-laden aqueous fluid;

d.2 induce flow of the mixed fluid from the primary mixing tank into a lower region of the secondary mixing tank via the fluid transfer means; and d.3 induce flow of mixed fluid upward from the secondary mixing tank into the settling tank via the overflow means;

(e) allowing solids to precipitate out of the fluid within the settling tank and to accumulate in the collection area of the settling tank, with any solids contacting the sloped floor of the settling tank floor being urged toward the collection area by gravity;

(f) collecting clarified fluid from the spillway; and (g) discharging solids-laden fluid from the collection area for dewatering in a centrifuge.

Preferably, the primary agitation means is adapted to induce a downward fluid current within the primary mixing tank, and the secondary agitation means is adapted to induce an upward fluid current within the secondary mixing tank. For example, the primary and secondary agitation means can each be provided in the form of conventional mixers or agitators having motor-driven vertical shafts that rotate propeller-type agitator elements, with the pitch of the agitator blades or paddles being configured to suit the desired fluid current (i.e., the pitch of the agitator blades for the primary agitation means would be opposite to that of the secondary agitation means). Alternatively, the respective upward and downward currents in the primary and secondary mixing tanks could be initiated by using agitator motors turning in opposite directions.

In preferred embodiments, the apparatus also comprises one or more chemical mixing tanks, plus means for conveying fluids from the chemical mixing tank to the primary mixing tank.

Also in preferred embodiments, the apparatus further comprises a generally horizontal spillway adjacent to an upper region of the settling tank. The spillway has a clean water outlet port plus one or more gates operable to allow fluid flow from the settling tank into the spillway or from the spillway into the settling tank. The spillway may also include outlet means whereby fluids may be collected from the spillway. The spillway may further have a gate operable to allow fluid flow from the spillway into the primary mixing tank, plus a gate operable to allow fluid flow from the spillway into the secondary mixing tank. In embodiments incorporating a chemical mixing tank and a spillway, the spillway preferably has a gate to allow fluid flow from the spillway into the chemical mixing tank.

In particularly preferred embodiments, the apparatus also incorporates a plurality of spaced and substantially vertical baffles extending across the settling tank transverse to the slope of sloped floor of the settling tank. Each baffle has an upper edge and a lower edge, and the lower edge is disposed a selected distance above the sloped floor. Each baffle is provided with a baffle adjacent to the baffle's upper edge, plus gate actuation means for operating the baffle gate between a closed position and an open position. Preferably, the lateral positions of the baffle gates are staggered from one baffle to the next, so as to induce a meandering or serpentine pattern of liquid flow in the settling tank.

In embodiments having transverse baffles, the apparatus preferably further includes baffle-cleaning means for removing solid matter built up on the baffles. The baffle-cleaning means may include a wash pipe running adjacent to each baffle, with each wash pipe having a plurality of orifices oriented to direct a stream of water from wash pipe toward a selected vertical face of the baffle.

BRIEF DESCRIPTION OF THE DRAWINGS

Embodiments of the invention will now be described with reference to the accompanying figures, in which numerical references denote like parts, and in which.

DETAILED DESCRIPTION OF THE INVENTION

Figure 1:
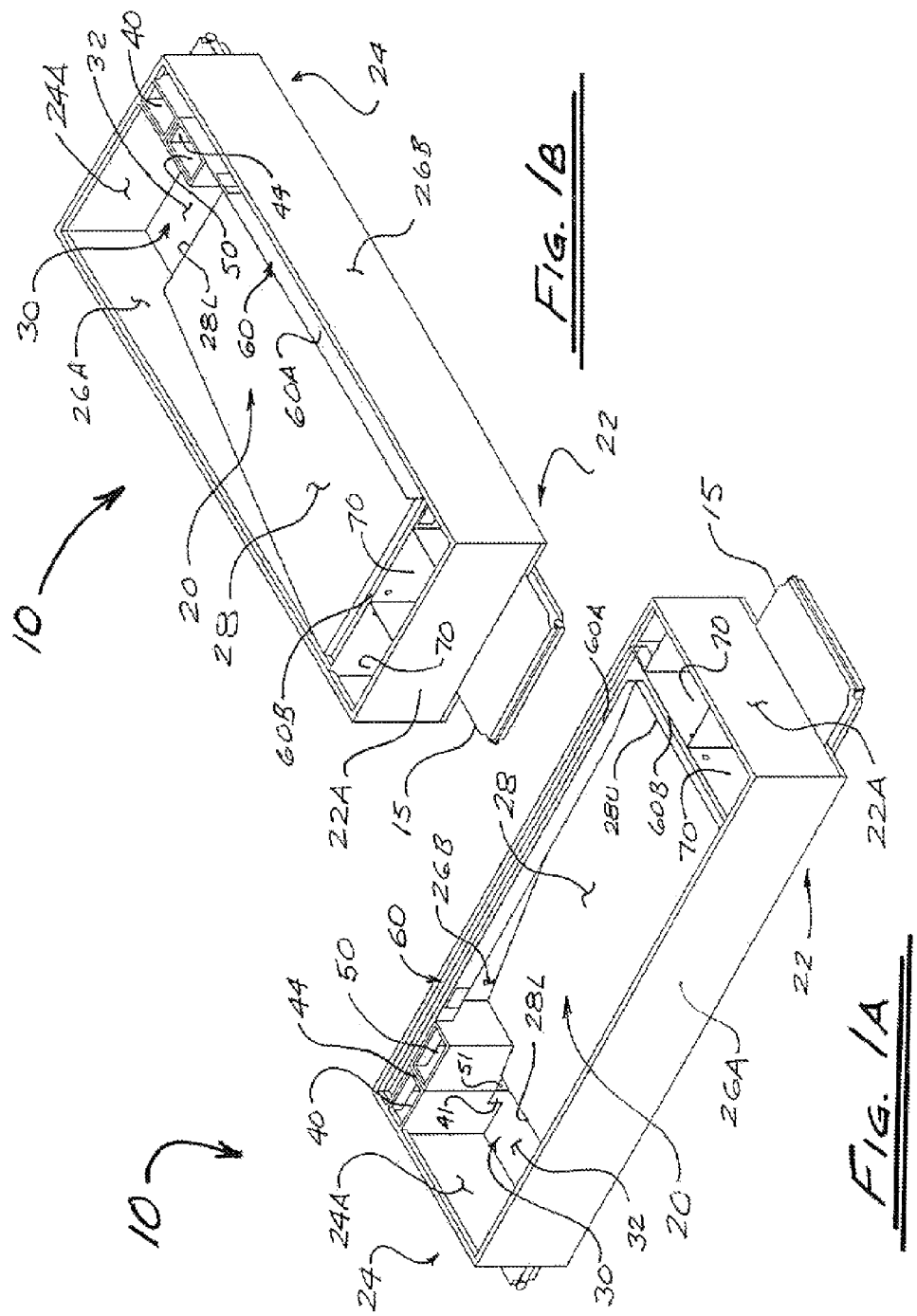
FIGS. 1A and 1B are isometric views of ah apparatus for removing suspended solids from aqueous solutions, in accordance with a first embodiment of the present invention.

As illustrated in FIGS. 1A and 1B, the apparatus 10 includes a settling tank 20 having a first end 22 and a second end 24. Settling tank 20 preferably (but not necessarily) has a generally rectangular configuration as shown, and is bounded by side walls 26A and 26B and end walls 22A and 24A. Settling tank 20 has a sloped floor 28 which slopes downward from an upper end 28U associated with first end 22 of settling tank 20 to a lower end 28L close to but separated from second end 24 of settling tank 20. As may be required for structural purposes, suitable support posts or sub-walls (schematically indicated by reference numeral 29 in FIGS. 3 and 4) may be provided to support sloping floor 28.

An open-top collection chamber 30 is formed between lower end 28L of sloped floor 28 and end wall 24A, such that solid materials traveling down sloped floor 28 can drop into collection chamber 30 upon reaching lower end 28L of sloped floor 28. Collection chamber 30 has a floor 32 at an elevation lower than lower end 28L of sloped floor 28; collection chamber floor 32 extends between end wall 24A and an intermediate wall 34 which extends downward from lower end 28L of sloped floor 28 to collection chamber floor 32.

Sloped floor 28 of settling tank 20 may oriented at an angle between 5 and 30 degrees to horizontal. However, it has been found that optimal performance of apparatus 10 may be achieved with sloped floor 28 at approximately 10 degrees to horizontal.

As shown in FIGS. 1A and 1B, apparatus 10 may be mounted on a suitable skid (generally indicated by reference numeral 15) to facilitate on-site positioning of apparatus 10 and to facilitate transportation of apparatus 10 between worksites. However, this is not essential to the invention.

Apparatus 10 also includes a primary mixing tank 40 and a secondary mixing tank 50. Also provided (as conceptually indicated in FIGS. 2, 3, and 4) are primary agitation means 42 for purposes of mixing or agitating fluids within primary mixing tank 40, and secondary agitation means 52 for purposes of mixing or agitating fluids within secondary mixing tank 50. There is no particular limitation on the type of equipment that could be used for purposes of agitation means 42 and 52, but in the preferred embodiment of apparatus 10, agitators of a type well known in the field (e.g., with a top-mounted motor rotating a vertical shaft having paddles or blades mounted thereto) are used for these purposes. The pitch of the agitator paddles or blades for primary agitation means 42 will preferably be opposite to the blade/paddle pitch for secondary agitation means 52, such that actuation of primary agitation means 42 will tend to induce a downward fluid current within the primary mixing tank 40, and actuation of secondary agitation means 52 will tend to induce an upward fluid current within secondary mixing tank 50. Alternatively, these desirable differential fluid currents may induced by using agitator motors turning in opposite directions.

Figure 3:
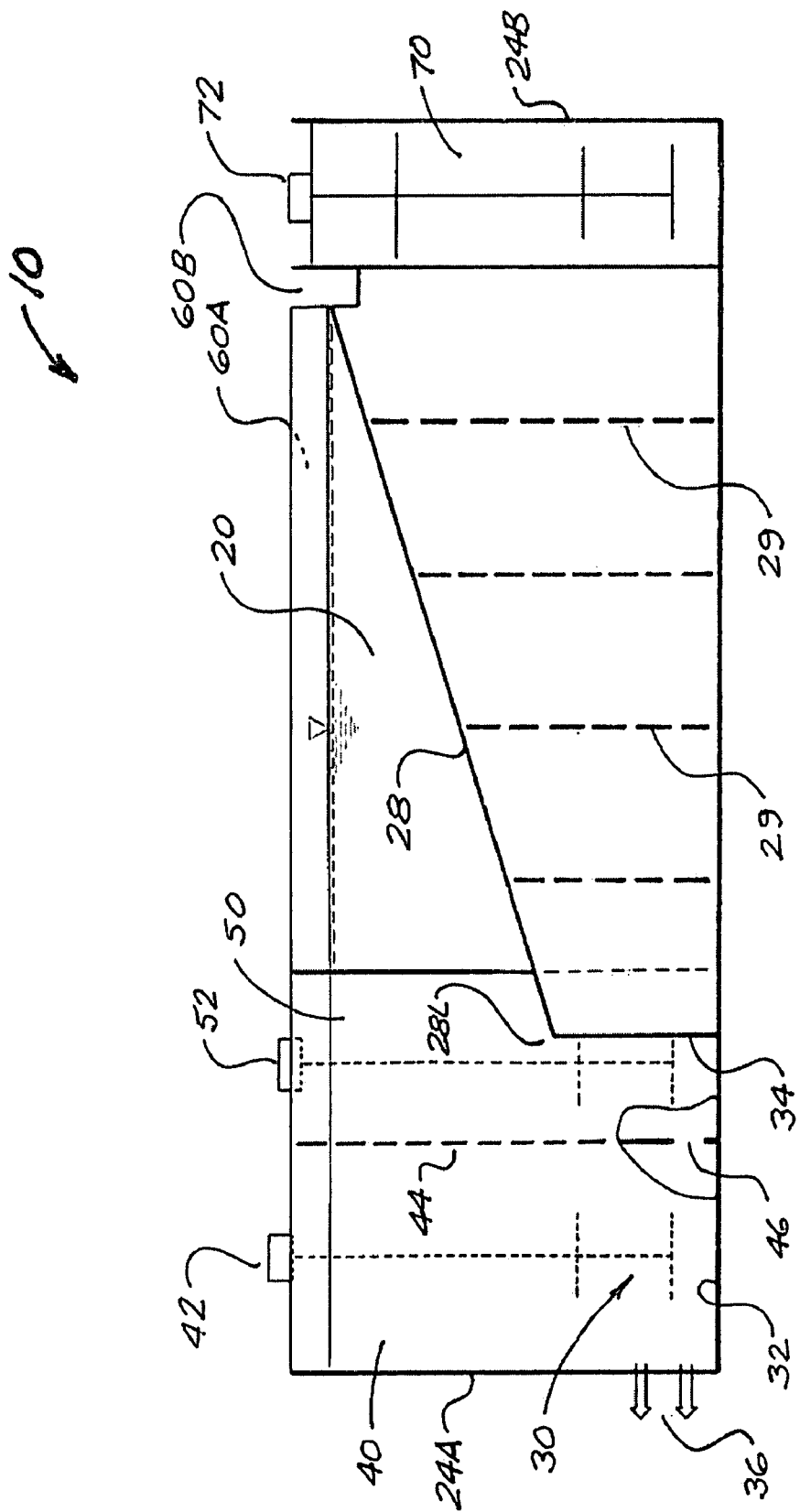
FIG. 3 is an elevation of a first side of the apparatus of FIG. 1.
Figure 4:
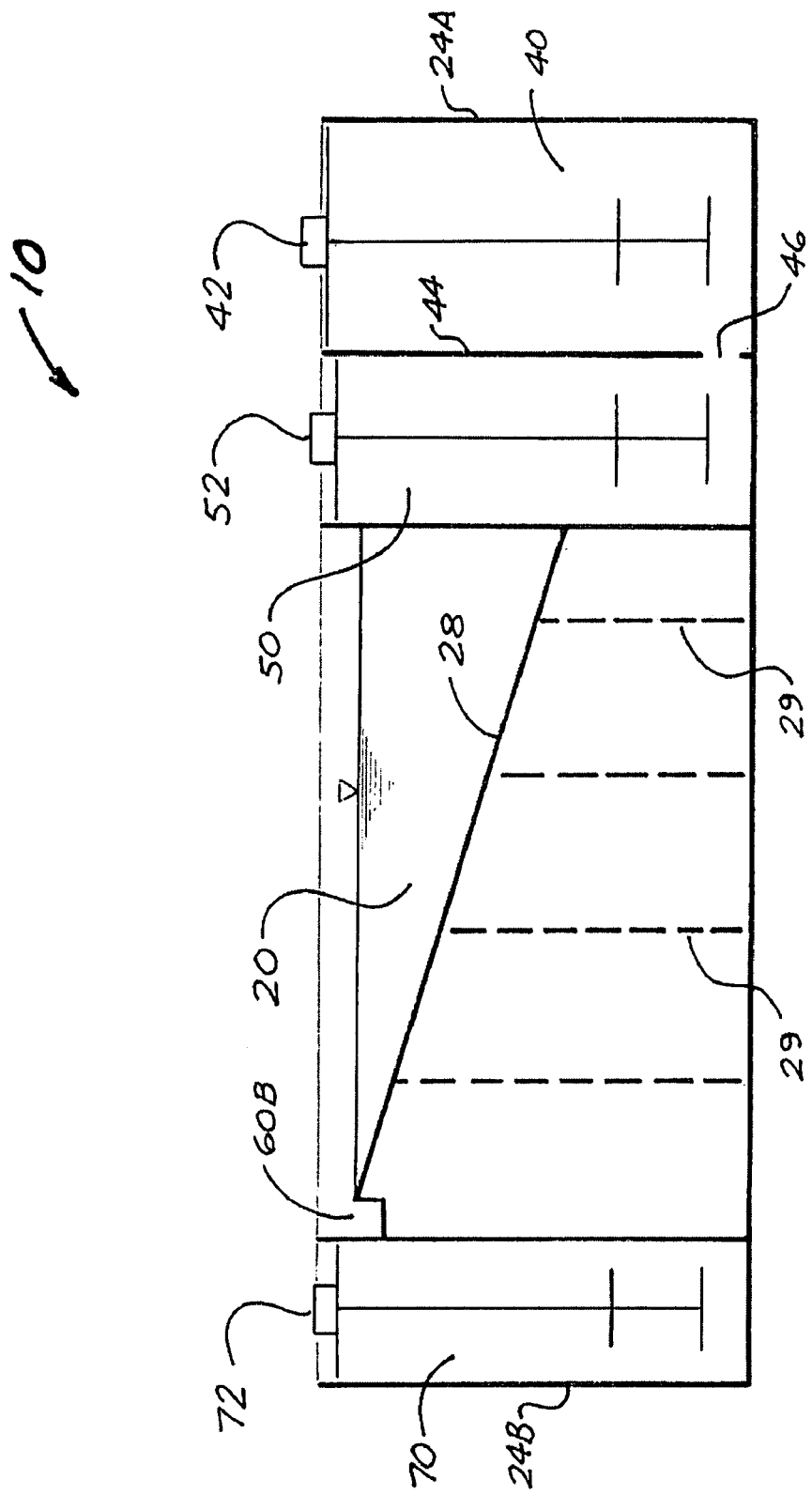
FIG. 4 is an elevation of a second side of the apparatus of FIG. 1.

In the illustrated embodiments, primary mixing tank 40 and secondary mixing tank 50 are in a side-by-side arrangement, separated by a dividing wall 44. Primary mixing tank 40 and secondary mixing tank 50 are in fluid communication through appropriate fluid transfer means permitting fluids to flow from a lower region of primary mixing tank 40 into a lower region of secondary mixing tank 50. As shown in FIGS. 3 and 4, this fluid transfer means may be provided in the form of a transfer port 46 near the bottom of dividing wall 44. However, persons skilled in the art of the invention will readily appreciate that the fluid transfer means could take other forms (for example, a conduit extending between lower regions of primary mixing tank 40 and secondary mixing tank 50), without substantially affecting the operation of apparatus 10.

Figure 2:
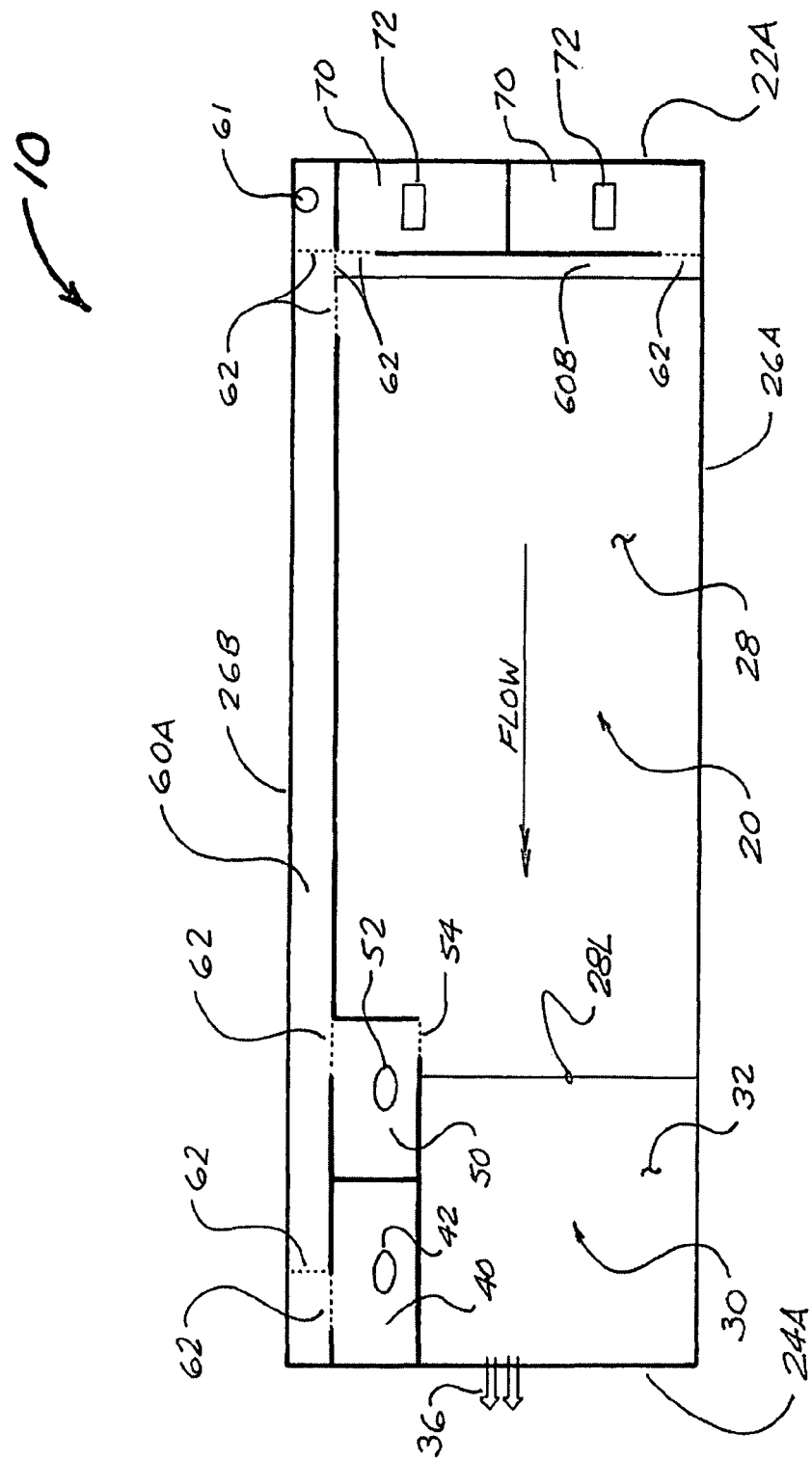
FIG. 2 is plan view of the apparatus of FIG. 1.

Apparatus 10 also includes overflow means in an upper region of secondary mixing tank 50, whereby fluids can overflow from secondary mixing tank 50 into settling tank 20, preferably but not necessarily in the vicinity of second end 24 thereof (i.e., the deeper end). As shown in FIG. 2, the overflow means may be provided in the form of an overflow port 54 or scupper in a secondary mixing tank wall immediately adjacent to settling tank 20, such that fluids can flow from secondary mixing tank 50 through overflow port 54 directly into settling tank 20. However, the overflow means could be provided in other forms without departing from the scope of the present invention. For example, the overflow means could be in the form of a conduit or spillway passing through or over a wall of secondary mixing tank 50. Furthermore, it is not essential for any portion of secondary mixing tank 50 to be immediately adjacent to settling tank 20, since the provision of overflow means in the form of a conduit or spillway would make it feasible to have secondary mixing tank 50 separated from settling tank 20.

Also in the illustrated embodiment, both primary mixing tank 40 and secondary mixing tank 50 are disposed within the rectangular perimeter of the settling tank 20, with primary mixing tank 40 being adjacent to both side wall 26B and end wall 24A, and with secondary mixing tank 50 being adjacent to side wall 26B. However, this preferred arrangement is for reasons of compactness and efficiency, and is not essential to the invention; other functionally effective arrangements could be readily devised without departing from the concept of the invention. For example, either or both of primary mixing tank 40 and secondary mixing tank 50 could be positioned outside settling tank 20, either adjacent to or spaced away from settling tank 20 (using an appropriate form of overflow means as previously discussed). Moreover, it is not essential for primary mixing tank 40 and secondary mixing tank 50 to be side-by-side; it would be functionally feasible for these components to be separated from each other, in conjunction with an appropriate form of fluid transfer means (such as a conduit).

In preferred embodiments of apparatus 10, and as shown in FIGS. 1A and 1B, a clean-out port 41 is provided at the base of primary mixing tank 40 such that solids and sludge accumulating within primary mixing tank 40 can be conveniently washed into collection chamber 30 when settling tank 20 and collection chamber 30 are empty. A similar clean-out port 51 is also preferably provided in association with secondary mixing tank 50. Clean-out ports 41 and 51 are provided with suitable gates which, although shown in their open positions in FIG. 1A, will be closed during normal operation of apparatus 10.

As shown in FIGS. 2, 3, and 4, one or more sludge outlet ports 36 are provided in association with collection chamber 30, for conveying accumulated aqueous sludge from collection chamber 30 to external treatment equipment or to disposal facilities. In preferred embodiments of the method of the invention, the sludge is pumped from collection chamber 30 to treatment equipment comprising one or more centrifuges (not shown), and the clarified residual water remaining after the centrifuges have removed the solids from the sludge can be recycled for use in well-drilling operations, recycled for use in conjunction with apparatus 10 (as discussed below), or pumped to storage for future use.

In the illustrated embodiment, two outlet ports 36 are shown extending through end wall 24A; this is a preferred configuration, but other functionally effective configurations are possible. In one preferred embodiment, each outlet port 36 comprises a 3-inch or 4-inch outlet pipe fitted with a two-way manually-operated valve that can be connected to a pump for conveying sludge to a centrifuge or disposal facility.

In preferred embodiments (and as illustrated in FIGS. 1A, 1B, 5A, and 5B), apparatus 10 includes a generally horizontal, open-topped spillway 60 adjacent to an upper region of settling tank 20. In the illustrated embodiments, spillway 60 runs longitudinally along side wall 26B, but this particular arrangement is not essential to the invention; spillway 60 could be provided in alternative configurations while retaining its desired function, as further described below. Spillway 60 has one or more gates 62 that can be selectively opened to direct fluids from settling tank 20 into spillway 60, or to allow fluids to flow from settling tank 20 into spillway 60. In the preferred embodiment shown in the Figures, in which primary mixing tank 40 and secondary mixing tank 50 are disposed within the rectangular perimeter of the settling tank 20 adjacent to side wall 26B, spillway 60 has additional gates 62 that are selectively operable to direct fluids from spillway 60 into primary mixing tank 40 and/or secondary mixing tank 50 as may be desired. Spillway 60 preferably also has a clean water outlet port 61, to facilitate diversion and collection of clean water from spillway 60 for other or future uses.

As described later in this specification, the preferred embodiment of the method of the present invention involves the step of introducing selected amounts of coagulants and/or flocculants into primary mixing tank 40, to be mixed with solids-laden aqueous fluid in primary mixing tank 40. For convenience in this regard, the preferred embodiment of apparatus 10 incorporates one or more chemical mixing tanks 70, preferably including chemical agitator means 72. As shown in the Figures, chemical mixing tanks 70 may be conveniently located within the perimeter of settling tank 20, adjacent to end wall 22A. However, it is not essential to the present invention for apparatus 10 to incorporate chemical mixing tanks, which could in fact be located away from apparatus 10 (with suitable piping or other conduit means being provided for conveying chemical solutions from chemical mixing tanks 70 to primary mixing tank 40).

In embodiments of apparatus 10 that incorporate one or more chemical mixing tanks 70, spillway 60 is preferably configured such that a portion of spillway 60 runs adjacent to chemical mixing tanks 70, with additional gates 62 operable to allow fluids within spillway 60 to be selectively directed into chemical mixing tanks 70. In the illustrated embodiment, this preferred capability is provided by fashioning spillway 60 in an L-shaped configuration, comprising a longitudinal leg 60A running adjacent to side wall 26B as previously described, and a transverse leg 60B running adjacent to the chemical mixing tanks 70. This allows clean water from spillway 60 to be used as make-up water for purposes of preparing chemical solutions in chemical mixing tanks 70. (In this and similar contexts in this patent document, the term "clean water" refers to the comparatively clean water from upper regions of settling tank 20 after there has been significant or substantial settlement or precipitation of solids from solids-laden fluid introduced into settling tank 20).

The method of the present invention may be readily understood having regard to the foregoing description of the apparatus 10 of the invention. In general terms, the method of the invention can be summarized as a method for recovering water from aqueous fluids containing solid matter utilizing a selected embodiment of apparatus 10, and comprising the following steps:

- introducing a flow of solids-laden aqueous fluid into primary mixing tank 40;
- introducing selected amounts of precipitation enhancement agents such as coagulants and/or flocculants (preferably in aqueous solution form) into primary mixing tank 40;
- activating primary agitation means 42 and secondary agitation means 52 (thus mixing the coagulants and/or flocculants into the solids-laden fluid, and inducing or promoting flow of the mixed fluid out of primary mixing tank 40 into secondary mixing tank 50 through transfer port 46, and out of secondary mixing tank 50 into settling tank 20 through overflow port 54);
- allowing solids to settle and/or precipitate out of the mixed fluid within settling tank 20 and to accumulate in collection chamber 30 of settling tank 20 (with any solids contacting sloped floor 28 of settling tank 20 being urged toward collection chamber 30 with the assistance of gravity); and
- conveying solids-laden sludge from collection chamber 30 through outlet ports 36, to a disposal or treatment facility.

Persons skilled in the art will appreciate that some of the steps summarized above may take place concurrently rather than sequentially, and that the specific order in which certain steps are initiated is not necessarily essential to the method of the invention.

The method of the present invention is not dependent on the use of any particular type of coagulants or flocculants. The coagulants or flocculants to be used in a given application will be selected having regard to case-specific parameters. In cases where the method is being used to remove water from aqueous drilling fluids, these chemical selection parameters may include the type and composition of the drilling fluid, and the physical and chemical characteristics of the subsurface formation materials being drilled through using the drilling fluid.

In preferred embodiments of the method, clean water is allowed to overflow from settling tank 20 into spillway 60, and this clean water may then be used in a variety of ways. For example, some of the clean water could be recycled into selected mixing tanks and/or chemical tanks as previously mentioned. Another possibility would be to use clean water collected from spillway 60 (e.g., via clean water outlet port 61) in the preparation of aqueous drilling muds for purposes of drilling operations. Alternatively, the clean water can be conveyed to a storage tank for later use.

It should be noted that the provision of a spillway 60 is not essential for purposes of collecting clean water from settling tank 20. In alternative embodiments of the apparatus and methods of the invention, clean water could also be collected by simply providing a scupper or outflow pipe in an upper region of settling tank 20, preferably near the "deep end" 24 of settling tank 20. Persons of ordinary skill in the art will appreciate that clean water collected by such alternative means can be readily redirected to mixing tanks and/or chemical tanks using suitable pumps and piping arrangements.

In preferred embodiments of the method, sludge from collection chamber 30 will be directed to one or more centrifuges, which will remove solid matter to produce clarified residual water that may be as clean as or even cleaner than the "clean water" remaining in the upper regions of settling tank 20 after settlement and/or precipitation of solids as previously described. The residual water from the centrifuges may be recycled to settling tank 20 and/or the mixing tanks and/or the chemical tanks (either directly or via spillway 60), or it may be diverted for use in preparing drilling fluids, or it may be collected in a storage tank for future use.

It is well known to mix coagulants and/or flocculants into a solids-laden aqueous fluid to promote settlement or precipitation of solids from the fluid. However, the use of twin mixing tanks as in the present invention (i.e., primary mixing tank 40 and secondary mixing tank 50, with a low-level transfer port connecting them), induces fluid flow downward within primary mixing tank 40 and then upward within secondary mixing tank 50. As a result, the chemicals remain more thoroughly dispersed within the fluid, and for a comparatively longer time than in known methods, due to the current induced in the fluid mixture as it flows from primary mixing tank 40 into secondary mixing tank 50 and then spills from secondary mixing tank 50 into settling tank 20. This type of flow or current would not occur if only a single mixing tank were used, even in conjunction with an agitator. Due to the use of the twin mixing tank arrangement of the present invention, though, the improved chemical dispersal increases the chemicals' efficiency, thereby reducing the required amount of chemicals as compared with known systems. The process efficiency gains thus provided in accordance the present invention result not only in reduced chemical costs, but also reduced equipment costs (since smaller chemical pumps and hoses can be used) and reduced energy costs (since the smaller chemical pumps will consume less energy).

Figure 5:
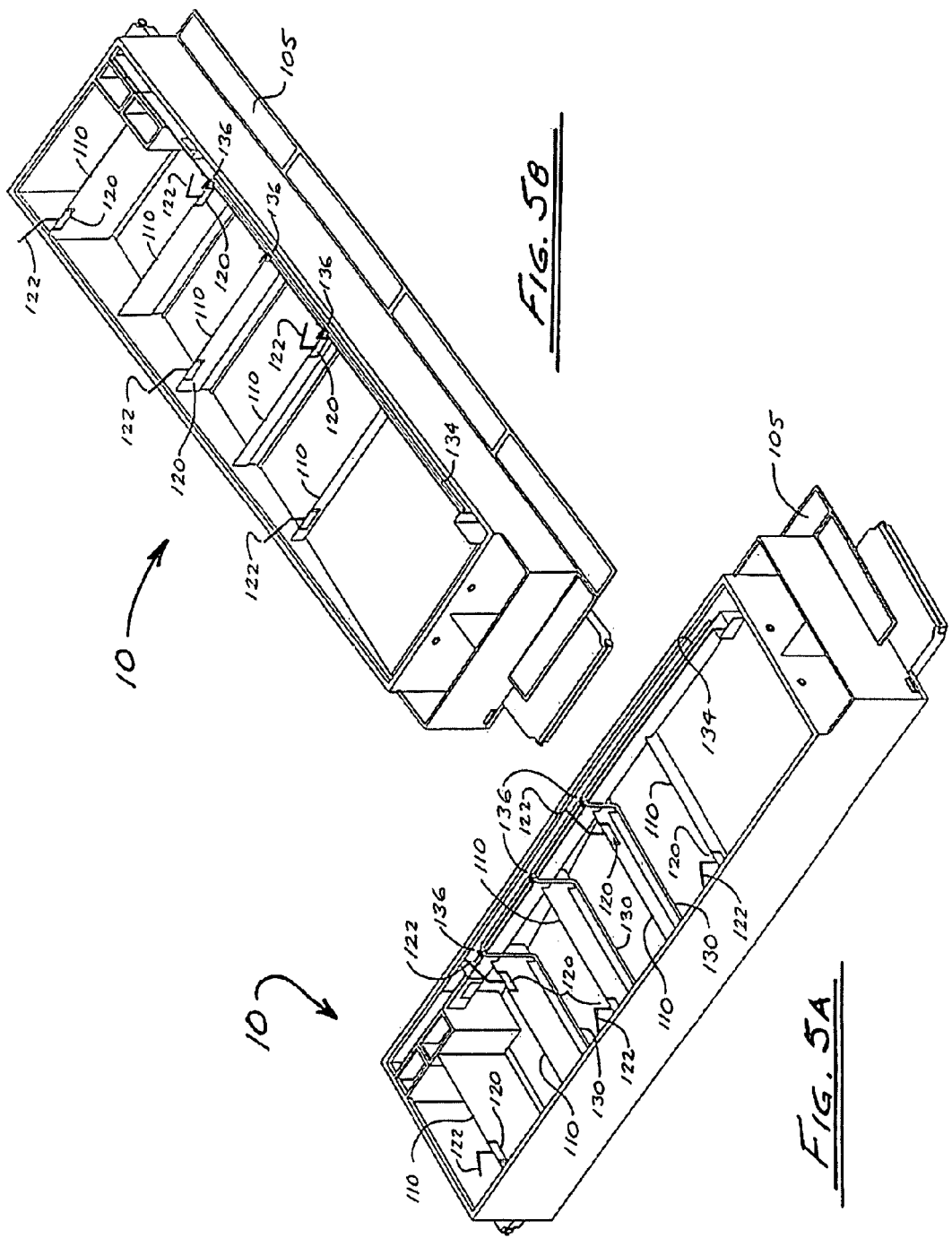
FIGS. 5A and 5B are isometric views of an alternative embodiment of the apparatus of the invention.
Figure 6:
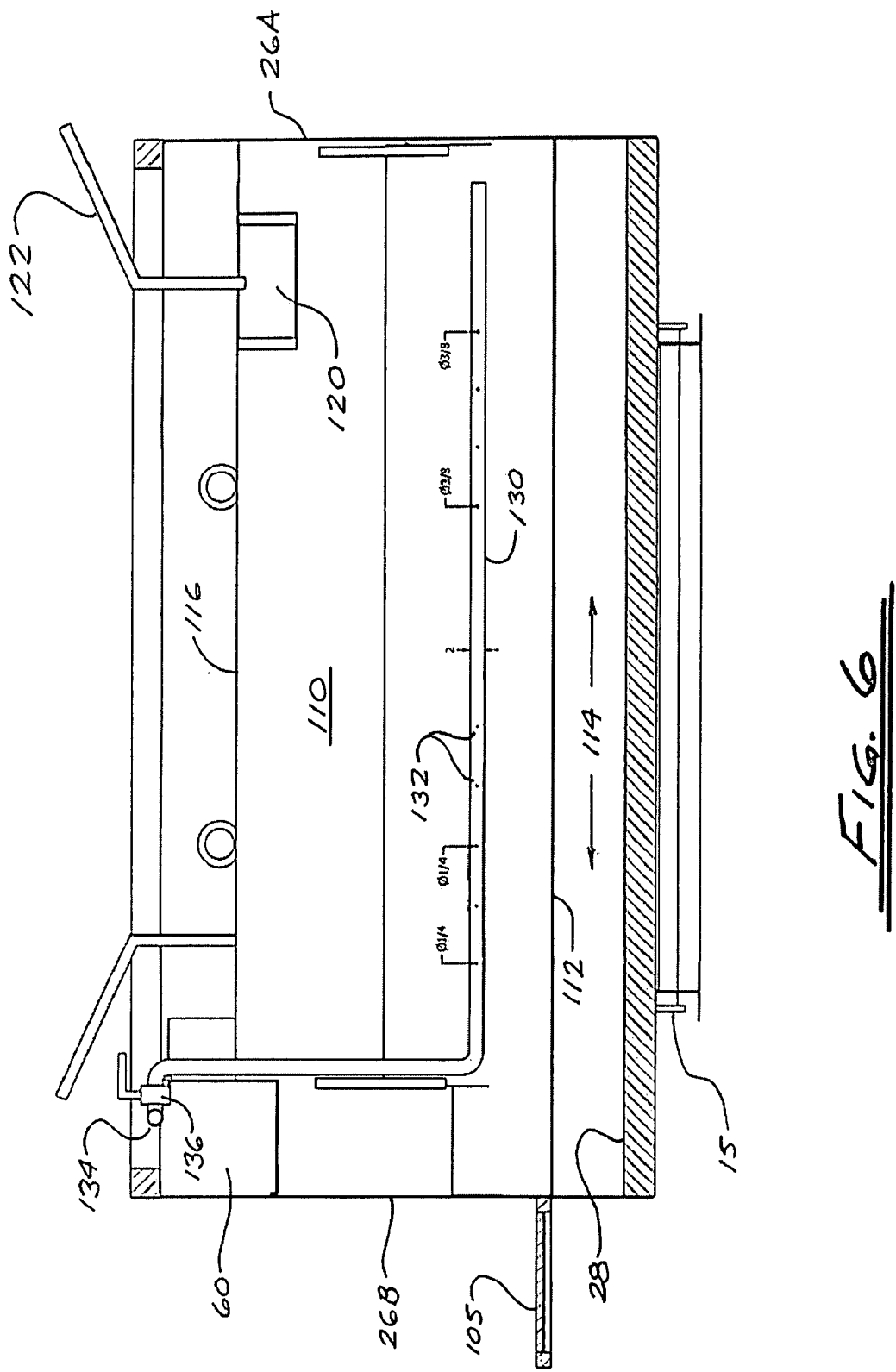
FIG. 6 is a transverse cross-section through the alternative embodiment of FIGS. 5A and 5B.

FIGS. 5A, 5B, and 6 illustrate a particularly preferred embodiment of apparatus 10, in which settling tank 20 has one or more baffles 110 are provided at selected intervals along the length of settling tank 20 and extending between side walls 26A and 26B, transverse to the slope of floor 28. Baffles 110 are oriented substantially vertically, with their lower edges 112 disposed a selected distance above sloped floor 28 of settling tank 20, thus creating a lateral space 114 such that solids settling or precipitating out of fluids introduced into settling tank 20 can freely pass below baffles 110 en route to collection chamber 30. The upper edges 116 of baffles 110 are disposed at a selected height, typically close to the fluid level in settling tank 20 during normal operation of apparatus 10.

Each baffle 110 preferably has a baffle gate 120 adjacent to upper edge 116 and disposed toward one side of settling tank 20. Baffle gate 120 may be of any suitable type (e.g., a swing gate, butterfly gate, or sliding gate), and will have manually-operated or mechanically-operated actuation means (conceptually indicated in the Figures as a handle 122) for selectively operating baffle gate 120 between a closed position and an open position. As best seen in FIGS. 5A and 5B, the positions of baffle gates 120 preferably alternate in staggered fashion (i.e., with the gate 120 for one baffle 110 being adjacent one side of settling tank 20, and with the gate 120 of the next baffle 110 being adjacent the other side of settling tank 20).

When staggered baffle gates 120 are in the open position, fluids in the upper zone of settling tank 20 will be induced to follow a meandering path as it moves toward first end 22 of settling tank 20. Accordingly, the retention lime of the fluid is increased relative to what it would be without baffle gates 120 being open, thus enhancing the efficiency of solids removal using the apparatus 10 and method of the present invention.

The upper-zone flow induced by opening baffle gates 120 (irrespective of their lateral locations in baffles 110) can have the additional beneficial effect of inducing a current which enhances the gravity-assisted flow of fluids and solids along sloped floor 28 toward collection chamber 30.

Preferably, in embodiments incorporating baffles 110, apparatus 10 also includes baffle-cleaning means for removing solid matter that may build up on the vertical faces of baffles 110. As illustrated in FIGS. 5A, 5B, and 6, this may be accomplished by running a wash pipe 130 laterally alongside each baffle 110, at a level above lower edge 112 of baffle 110, with each wash pipe 130 having a plurality of nozzles or orifices 132 and oriented so as to direct a stream of water from wash pipe 130 toward the vertical face of baffle 110. As illustrated, wash water may be fed to wash pipes 130 from a water manifold 134 running along one side of settling tank 20, with the flow of water into wash pipes 130 being selectively controlled by valves 136 at the junctures between wash pipes 130 and manifold 134. Wash water may be provided from any convenient source, including spillway 60 or a source external to apparatus 10.

Effective results have been achieved in certain applications using nominal 2-inch diameter wash pipes having orifice sizes varying from ¼-inch to ⅜-inch diameter (as shown by way of example in FIG. 6). However, the size of wash pipes 130 and the size and spacing of orifices 132 may be selected to suit specific process design requirements.

As shown in FIGS. 5A, 5B, and 6, apparatus 10 is preferably provided with a catwalk 105 to facilitate access to the baffle gate actuation means and valves 136.

In FIGS. 5A, 5B, and 6, numerical references to some components of apparatus 10 have been omitted in the interests of clarity, to facilitate illustration of additional features as described above. Reference may be had to the other Figures with respect to components not specifically referenced in FIGS. 5A, 5B, and 6.

It will be readily appreciated by those skilled in the art that various modifications of the present invention may be devised without departing from the essential concept of the invention, and all such modifications are intended, to come within the scope of the present invention and the claims appended hereto. It is to be especially understood that the invention is not intended to be limited to illustrated embodiments, and that the substitution of a variant of a claimed element or feature, without any substantial resultant change in how the invention works, will not constitute a departure from the scope of the invention.

In this patent document, the word "comprising" is used in its non-limiting sense to mean that items following that word are included, but items not specifically mentioned are not excluded. A reference to an element by the indefinite article "a" does not exclude the possibility that more than one of the element is present, unless the context clearly requires that there be one and only one such element.

What is claimed is:

1. A water recovery apparatus for recovering water from aqueous fluids containing suspended solid matter, said apparatus comprising:
   (a) a settling tank having a sloping floor extending from an upper end to a lower end;
   (b) a collection chamber adjacent to, and having a floor lower than, said lower end of the settling tank's sloping floor, said collection chamber having an outlet port;
   (c) a primary mixing tank;
   (d) primary agitation means associated with the primary mixing tank;
   (e) a secondary mixing tank;
   (f) secondary agitation means associated with the secondary mixing tank;
   (g) fluid transfer means whereby fluids can flow from a lower region of the primary mixing tank into a lower region of the secondary mixing tank;
   (h) overflow means whereby fluids can flow from an upper region of the secondary mixing tank into the settling tank; and
   (i) a generally horizontal spillway adjacent to an upper region of the settling tank, said spillway having:
      i.1 a clean water outlet port:
      i.2 a gate operable to allow fluid flow from the settling tank into the spillway or from the spillway into the settling tank; and
      i.3 a gate operable to allow fluid flow from the spillway into the primary mixing tank.

2. The water recovery apparatus of claim 1, further comprising a chemical mixing tank and means for conveying fluids from the chemical mixing tank to the primary mixing tank.

3. The water recovery apparatus of claim 1 wherein the spillway comprises outlet means whereby fluids may be collected from the spillway.

4. The water recovery apparatus of claim 1 wherein the spillway comprises a gate operable to allow fluid flow from the spillway into the secondary mixing tank.

5. The water recovery apparatus of claim 1 wherein the settling tank comprises a plurality of spaced and substantially vertical baffles extending across the settling tank transverse to the slope of sloped floor of the settling tank, each baffle having:
   (a) an upper edge and a lower edge, said lower edge being disposed a selected distance above the sloped floor;
   (b) a baffle gate adjacent said upper edge; and
   (c) gate actuation means for selectively operating the baffle gate between a closed position and an open position.

6. The water recovery apparatus of claim 5 wherein the lateral position of the baffle gate in at least one of the baffles is staggered relative to the position of the baffle gate in an adjacent baffle.

7. The water recovery apparatus of claim 5, further comprising baffle-cleaning means for removing solid matter built up on the baffles.

8. The water recovery apparatus of claim 7 wherein the baffle-cleaning means comprises a wash pipe running adjacent to each baffle, with each wash pipe having a plurality of orifices oriented to direct a stream of water from wash pipe toward a selected vertical face of the corresponding baffle.

9. The water recovery apparatus of claim 1 wherein:
(a) the primary agitation means is adapted to induce a downward fluid current within the primary mixing tank; and
(b) the secondary agitation means is adapted to induce an upward fluid current within the secondary mixing tank.

10. A water recovery apparatus for recovering water from aqueous fluids containing suspended solid matter, said apparatus comprising:
(a) a settling tank having a sloping floor extending from an upper end to a lower end;
(b) a collection chamber adjacent to, and having a floor lower than, said lower end of the settling tank's sloping floor, said collection chamber having an outlet port;
(c) a primary mixing tank;
(d) primary agitation means associated with the primary mixing tank;
(e) a secondary mixing tank;
(f) secondary agitation means associated with the secondary mixing tank;
(g) fluid transfer means whereby fluids can flow from a lower region of the primary mixing tank into a lower region of the secondary mixing tank;
(h) overflow means whereby fluids can flow from an upper region of the secondary mixing tank into the settling tank; and
(i) a generally horizontal spillway adjacent to an upper region of the settling tank, said spillway having:
i.1 a clean water outlet port;
i.2 a gate operable to allow fluid flow from the settling tank into the spillway or from the spillway into the settling tank; and
i.3 a gate operable to allow fluid flow from the spillway into the secondary mixing tank.

11. The water recovery apparatus of claim 10, further comprising a chemical mixing tank and means for conveying fluids from the chemical mixing tank to the primary mixing tank.

12. The water recovery apparatus of claim 10 wherein the spillway comprises outlet means whereby fluids may be collected from the spillway.

13. The water recovery apparatus of claim 10 wherein the settling tank comprises a plurality of spaced and substantially vertical baffles extending across the settling tank transverse to the slope of sloped floor of the settling tank, each baffle having:
(a) an upper edge and a lower edge, said lower edge being disposed a selected distance above the sloped floor;
(b) a baffle gate adjacent said upper edge; and
(c) gate actuation means for selectively operating the baffle gate between a closed position and an open position.

14. The water recovery apparatus of claim 13 wherein the lateral position of the baffle gate in at least one of the baffles is staggered relative to the position of the baffle gate in an adjacent baffle.

15. The water recovery apparatus of claim 13, further comprising baffle-cleaning means for removing solid matter built up on the baffles.

16. The water recovery apparatus of claim 15 wherein the baffle-cleaning means comprises a wash pipe running adjacent to each baffle, with each wash pipe having a plurality of orifices oriented to direct a stream of water from wash pipe toward a selected vertical face of the corresponding baffle.

17. The water recovery apparatus of claim 10 wherein:
(a) the primary agitation means is adapted to induce a downward fluid current within the primary mixing tank; and
(b) the secondary agitation means is adapted to induce an upward fluid current within the secondary mixing tank.

18. A water recovery apparatus for recovering water from aqueous fluids containing suspended solid matter, said apparatus comprising:
(a) a settling tank having a sloping floor extending from an upper end to a lower end;
(b) a collection chamber adjacent to, and having a floor lower than, said lower end of the settling tank's sloping floor, said collection chamber having an outlet port;
(c) a primary mixing tank;
(d) primary agitation means associated with the primary mixing tank;
(e) a secondary mixing tank;
(f) secondary agitation means associated with the secondary mixing tank;
(g) fluid transfer means whereby fluids can flow from a lower region of the primary mixing tank into a lower region of the secondary mixing tank; and
(h) overflow means whereby fluids can flow from an upper region of the secondary mixing tank into the settling tank;
(i) a chemical mixing tank and means for conveying fluids from the chemical mixing tank to the primary mixing tank; and
(j) a generally horizontal spillway adjacent to an upper region of the settling tank, said spillway having a gate operable to allow fluid flow from the settling tank into the spillway or from the spillway into the settling tank, said spillway comprising a gate operable to allow fluid flow from the spillway into the chemical mixing tank.

19. The water recovery apparatus of claim 18 wherein the settling tank comprises a plurality of spaced and substantially vertical baffles extending across the settling tank transverse to the slope of sloped floor of the settling tank, each baffle having:
(a) an upper edge and a lower edge, said lower edge being disposed a selected distance above the sloped floor;
(b) a baffle gate adjacent said upper edge; and
(c) gate actuation means for selectively operating the baffle gate between a closed position and an open position.

20. The water recovery apparatus of claim 19 wherein the lateral position of the baffle gate in at least one of the baffles is staggered relative to the position of the baffle gate in an adjacent baffle.

21. The water recovery apparatus of claim 19, further comprising baffle-cleaning means for removing solid matter built up on the baffles.

22. The water recovery apparatus of claim 21 wherein the baffle-cleaning means comprises a wash pipe running adjacent to each baffle, with each wash pipe having a plurality of orifices oriented to direct a stream of water from wash pipe toward a selected vertical face of the corresponding baffle.

23. The water recovery apparatus of claim 18 wherein:
(a) the primary agitation means is adapted to induce a downward fluid current within the primary mixing tank; and (b) the secondary agitation means is adapted to induce an upward fluid current within the secondary mixing tank.

24. A water recovery apparatus for recovering water from aqueous fluids containing suspended solid matter, said apparatus comprising:
   (a) a settling tank having a sloping floor extending from an upper end to a lower end;
   (b) a collection chamber adjacent to, and having a floor lower than, said lower end of the settling tank's sloping floor, said collection chamber having an outlet port;
   (c) a primary mixing tank;
   (d) primary agitation means associated with the primary mixing tank;
   (e) a secondary mixing tank;
   (f) secondary agitation means associated with the secondary mixing tank;
   (g) fluid transfer means whereby fluids can flow from a lower region of the primary mixing tank into a lower region of the secondary mixing tank; and
   (h) overflow means whereby fluids can flow from an upper region of the secondary mixing tank into the settling tank;
wherein the settling tank comprises a plurality of spaced and substantially vertical baffles extending across the settling tank transverse to the slope of sloped floor of the settling tank, each baffle having:
   (i) an upper edge and a lower edge, said lower edge being disposed a selected distance above the sloped floor;
   (j) a baffle gate adjacent said upper edge; and
   (k) gate actuation means for selectively operating the baffle gate between a closed position and an open position.

25. The water recovery apparatus of claim 24 wherein the lateral position of the baffle gate in at least one of the baffles is staggered relative to the position of the baffle gate in an adjacent baffle.

26. The water recovery apparatus of claim 24, further comprising baffle-cleaning means for removing solid matter built up on the baffles.

27. The water recovery apparatus of claim 26 wherein the baffle-cleaning means comprises a wash pipe running adjacent to each baffle, with each wash pipe having a plurality of orifices oriented to direct a stream of water from wash pipe toward a selected vertical face of the corresponding baffle.

28. The water recovery apparatus of claim 24 wherein:
   (a) the primary agitation means is adapted to induce a downward fluid current within the primary mixing tank; and
   (b) the secondary agitation means is adapted to induce an upward fluid current within the secondary mixing tank.

* * * * *